Figure 1:
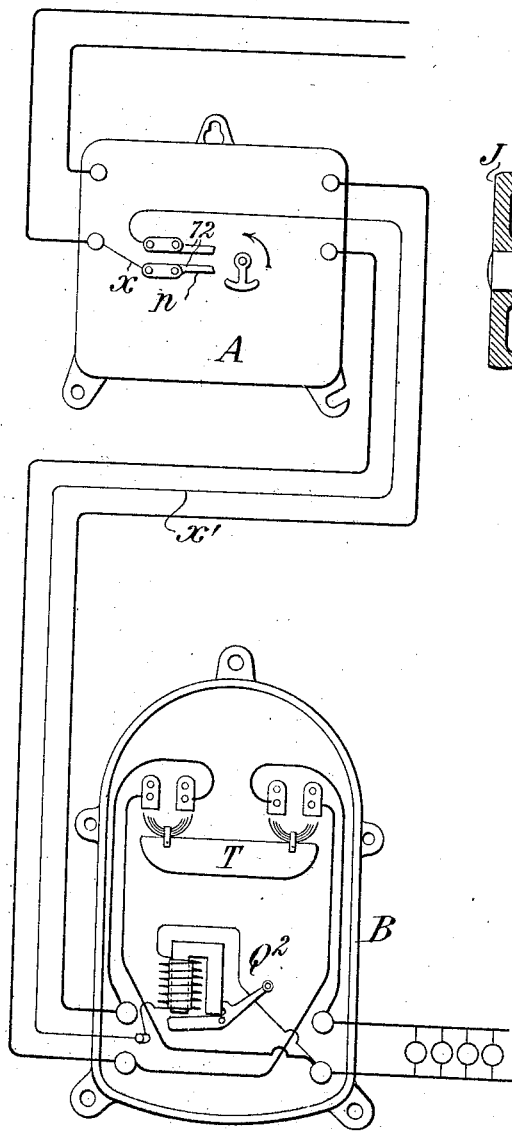

No. 822,091. PATENTED MAY 29, 1906.
J. J. WOOD.
PREPAYMENT ELECTRIC METER.
APPLICATION FILED JUNE 12, 1905.

5 SHEETS—SHEET 1.

WITNESSES:
Fred White
René Bruine

INVENTOR:
James J. Wood
By Attorneys
Arthur C. Fraser & Co.

No. 822,091. PATENTED MAY 29, 1906.
J. J. WOOD.
PREPAYMENT ELECTRIC METER.
APPLICATION FILED JUNE 12, 1905.

5 SHEETS—SHEET 2.

WITNESSES:
Fred White
René Pruine

INVENTOR:
James J. Wood,
By Attorneys,
Arthur G. Fraser & Co.

No. 822,091. PATENTED MAY 29, 1906.
J. J. WOOD.
PREPAYMENT ELECTRIC METER.
APPLICATION FILED JUNE 12, 1905.
5 SHEETS—SHEET 3.
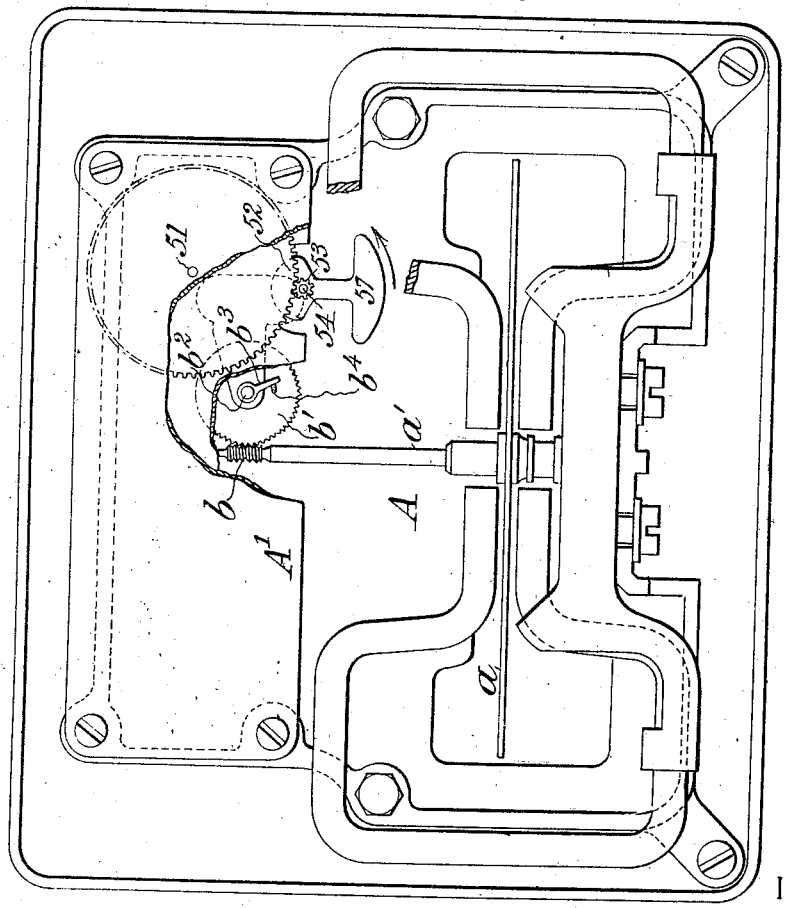
INVENTOR:
James J. Wood,
By Attorneys,
WITNESSES:

No. 822,091. PATENTED MAY 29, 1906.
J. J. WOOD.
PREPAYMENT ELECTRIC METER.
APPLICATION FILED JUNE 12, 1905.
5 SHEETS—SHEET 4.
FIG. 8.
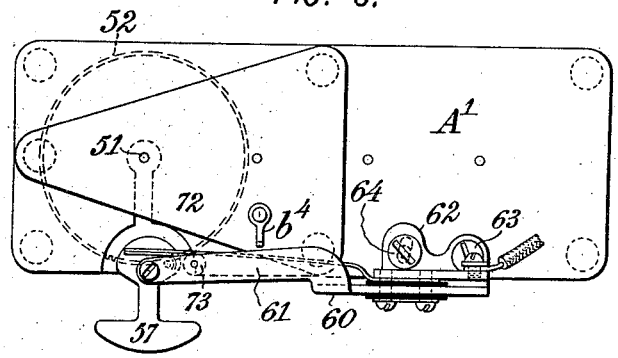
FIG. 11.
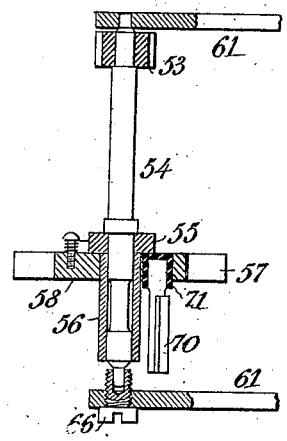
FIG. 9.
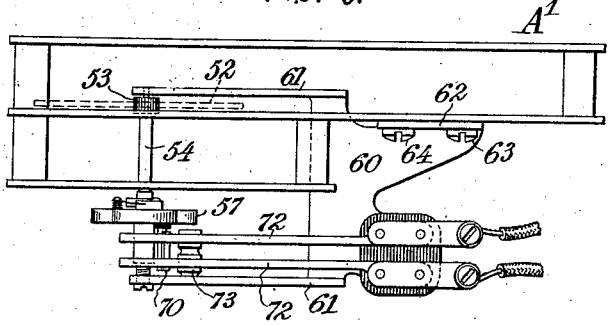
FIG. 12.
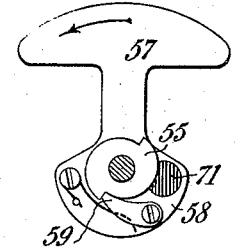
FIG. 10.
FIG. 13.
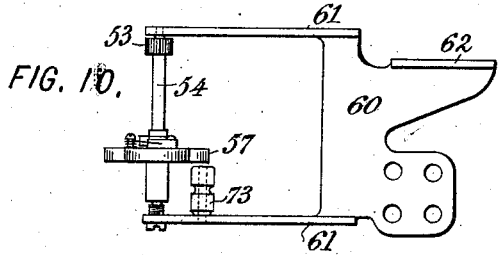
FIG. 14.
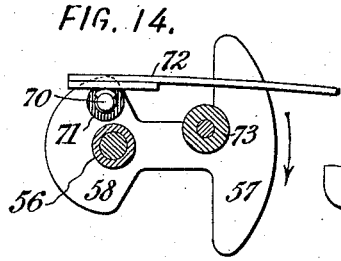
FIG. 15.
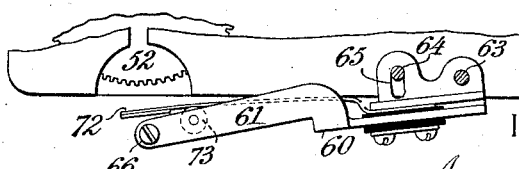
WITNESSES:
Fred White
René Bruine
INVENTOR:
James J. Wood,
By Attorneys,
Arthur C. Fraser & Co.

No. 822,091. PATENTED MAY 29, 1906.
J. J. WOOD.
PREPAYMENT ELECTRIC METER.
APPLICATION FILED JUNE 12, 1905.

5 SHEETS—SHEET 5.

WITNESSES:
Fred White
René Bruine

INVENTOR:
James J. Wood,
By Attorneys,
Arthur E. Draser

UNITED STATES PATENT OFFICE.

JAMES J. WOOD, OF FORT WAYNE, INDIANA.

PREPAYMENT ELECTRIC METER.

No. 822,091.  Specification of Letters Patent.  Patented May 29, 1906.

Application filed June 12, 1905. Serial No. 264,850.

*To all whom it may concern:*

Be it known that I, JAMES J. WOOD, a citizen of the United States, residing at Fort Wayne, in the county of Allen and State of Indiana, have invented certain new and useful Improvements in Prepayment Electric Meters, of which the following is a specification.

This invention relates to so-called "prepayment-meters" adapted to be operated through the medium of inserted coins or the like to count up a credit or prepayment and to be operated under control of the measuring device or meter to count down or diminish the prepaid credit as the commodity is consumed. A prepayment-meter of this character is set forth in detail in my application filed December 3, 1904, Serial No. 235,412, patented December 5, 1905, No. 806,722.

My present invention is directed chiefly to electric meters having a separate prepayment device—that is to say, where the prepayment mechanism instead of being applied directly to the electric meter, so as to be inclosed in the same general casing, is arranged more or less remote therefrom and inclosed in a casing of its own, so that it may be located at a place more convenient of access for the customer than the place where the electric meter itself is located. With such separate prepayment devices the counting-down operation is performed through the operation of an electromagnet or the like controlled by a circuit-closer in the electric-meter casing operated by the totalizer and connecting, through a separate wire, with the electromagnet in the casing of the prepayment device. My invention provides improvements in the circuit-closing means and the electromagnetically-operated counting-down mechanism of the prepayment device.

My invention aims to reduce to the minimum the work imposed upon the electric meter in operating the circuit-closer and to make the load imposed upon the meter as uniform as possible at all the different stages of the operation.

It also aims to reduce to the minimum the work to be performed by the electromagnet in operating the counting-down mechanism of the prepayment device and to render this work substantially alike at each excitation of the magnet; also, to prevent the possibility of erroneous operation and of interference in the event of the counting-up and counting-down operations occurring simultaneously.

Another object of my invention is to adapt the prepayment mechanism to be applied indifferently to either a direct or alternating circuit.

The preferred embodiment of my invention is shown in the accompanying drawings, wherein—

Figure 5:
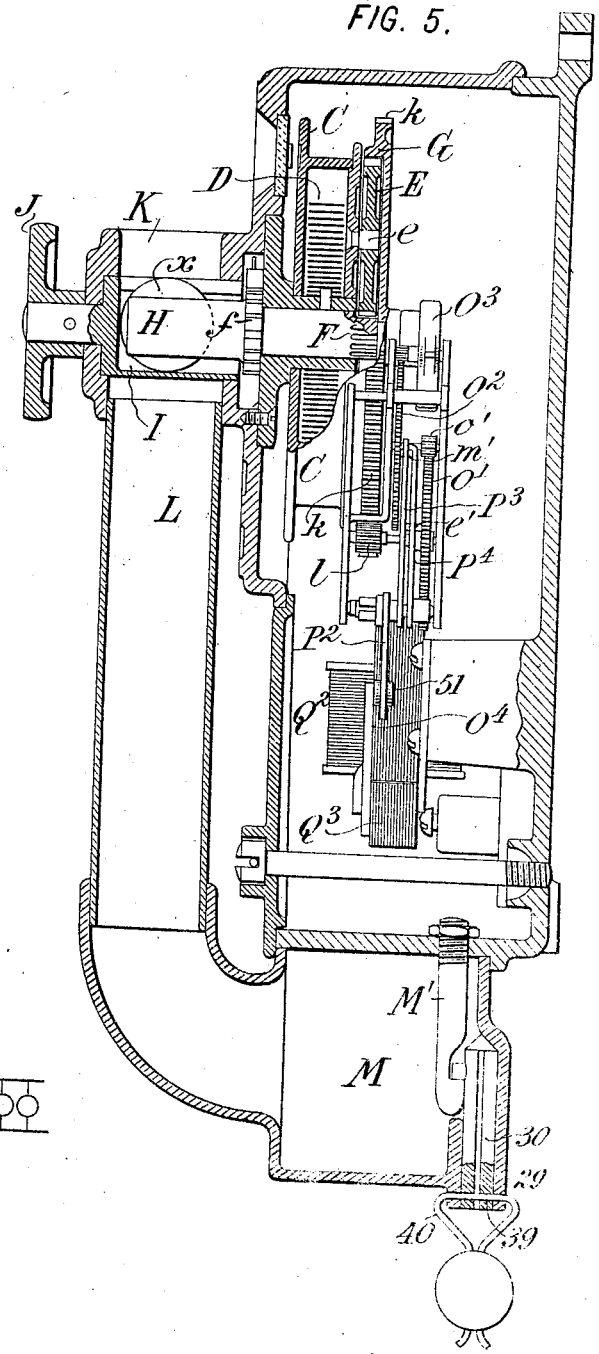
Figure 2:
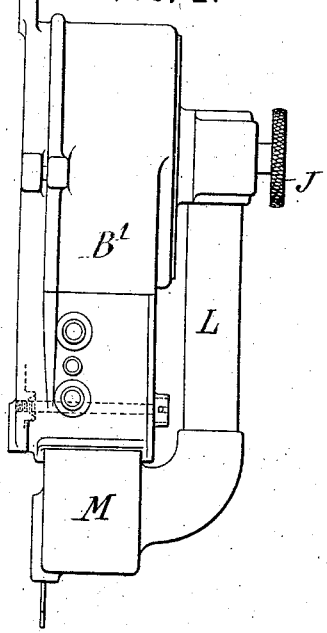
Figure 4:
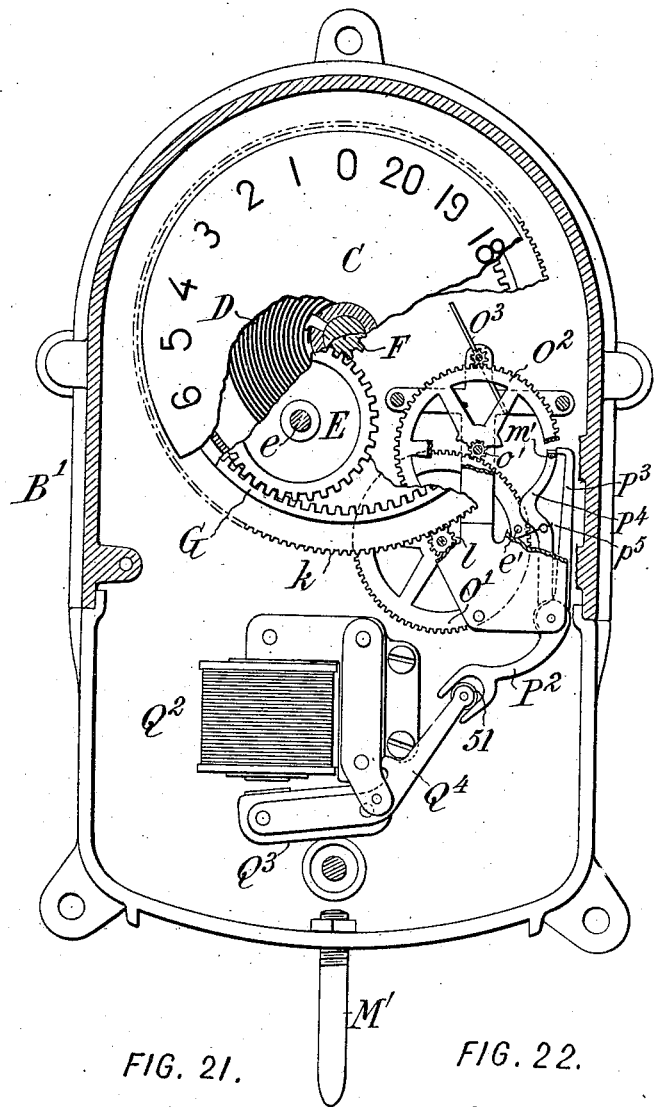
Figure 3:
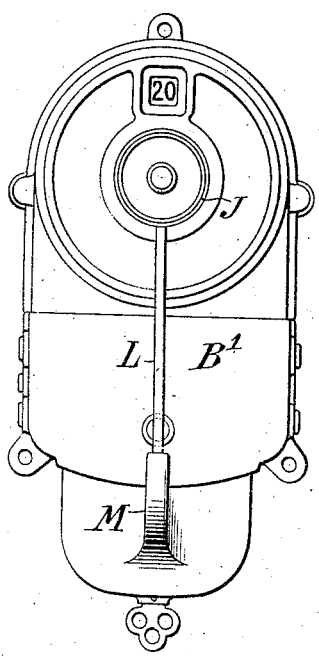
Figure 21:
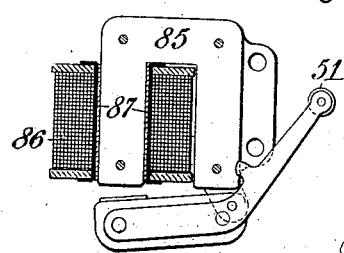
Figure 22:
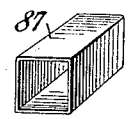
Figure 16:
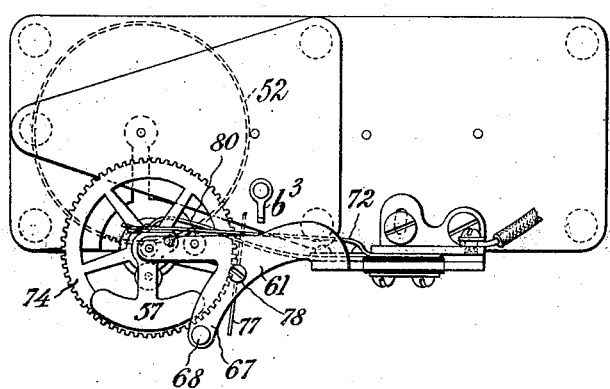
Figure 17:
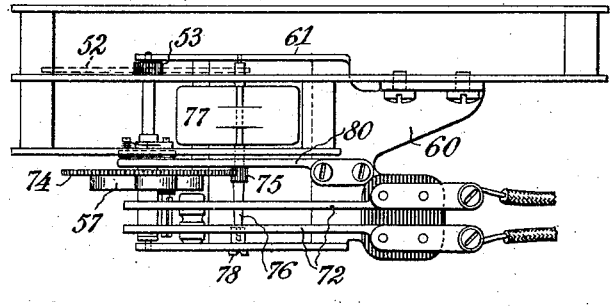
Figure 19:
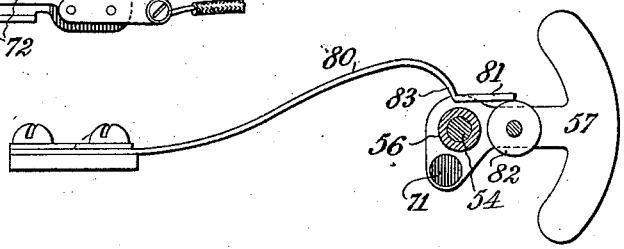
Figure 18:
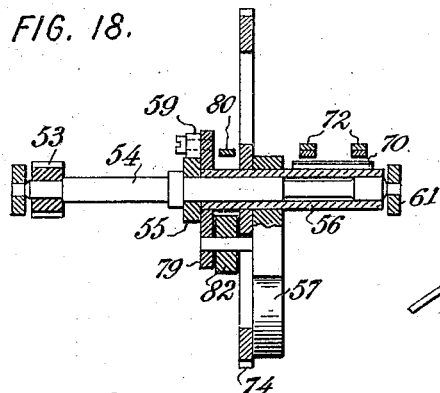
Figure 20:
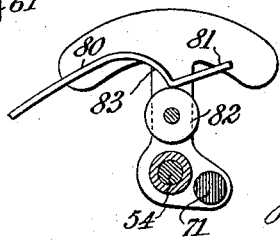

Figure 1 is a diagrammatic view illustrating the meter and prepayment device and their circuit connections. Figs. 2 and 3 are respectively side and front elevations of the separate prepayment device. Fig. 4 is a dissected front view of the prepayment mechanism, showing its casing in vertical section and certain of the moving parts being broken or dissected away in order to show the counting-down or escapement mechanism in full. Fig. 5 is a vertical transverse section of the prepayment device, showing the escapement mechanism mainly in side elevation. Fig. 6 is a front view of the electric meter, the front of its casing being removed to show the interior mechanism and the totalizer being partly dissected away to show the operative parts. Fig. 7 is a fragmentary side elevation of portions of the electric meter, showing the application of my invention thereto. Fig. 8 is a rear elevation of the totalizer and circuit-closer removed. Fig. 9 is a plan of Fig. 8. Fig. 10 is a plan of part of the circuit-closer and its supporting-frame separated from the totalizer. Fig. 11 is an enlargement of the left-hand portion of Fig. 10, partially in section. Fig. 12 is a fragmentary front view of part of the circuit-closer, showing the weight elevated and ready to fall. Fig. 13 is a similar view showing the weight just after falling. Fig. 14 is a rear view of the same parts, showing the weight in the act of falling. Fig. 15 is a fragmentary rear elevation corresponding to Fig. 8, showing the structure partly dismantled. Figs. 16 and 17 are respectively a rear elevation and plan answering to Figs. 8 and 9, respectively, and showing a construction embodying an additional feature of the invention. Fig. 18 is an enlarged vertical section in the plane of the circuit-closer spindle. Figs. 19 and 20 are front views of parts of the structure shown in Figs. 16 to 18 in two different positions. Fig. 21 is a detached and partly-sectional view showing the magnet of Fig. 4. Fig. 22 is a perspective view showing a detail of this magnet.

The particular prepayment mechanism shown in the drawings is that of my said Patent No. 806,722, with some modifications or improvements of detail, which are set forth in another application, filed May 25, 1905, Serial No. 262,194, to which reference is made for a more complete disclosure of the details of the prepayment mechanism. In my present application I illustrate and describe only so much of this mechanism as is necessary to a comprehension of the features peculiar to this invention.

In the drawings let A designate the electric meter, and B the prepayment device. The electric meter may be of any known kind or type, the example shown being a well-known construction of meter having a disk armature $a$ mounted on a spindle $a'$, constructed to rotate at a rate proportional to the consumption of electric energy and by its rotation to drive or otherwise control the speed of any usual totalizing mechanism or totalizer A'—for example, by a worm $b$ driving a worm-wheel $b'$, Fig. 6, the spindle $b^2$ of which by any suitable connection may drive the usual train of gearing of the totalizer. The electric meter is inclosed, as usual, in any suitable casing $A^2$. The totalizer-train operates a circuit-closer which at intervals closes a circuit through a separate wire $x'$, leading to an electromagnet $Q^2$ in the casing of the prepayment mechanism which controls the counting-down movements thereof.

In describing the prepayment device B, I will, in so far as the parts are identical, use the same letters of reference as in my said patent. The prepayment mechanism is inclosed in a suitably-constructed casing B', which may conveniently be made in sections put together in any suitable way. Within this casing is mounted a rotative disk C, called the "credit-indicator," carrying numbers displayed through an opening in the front of the casing. This indicator is turned step by step in one direction through the medium of inserted coins to count up their value to the credit of the consumer and is turned in the contrary direction to count down the accumulated credit as the electric energy is consumed. A spring D of numerous convolutions imparts a constant stress to turn the indicator in the counting-down direction. A planet-wheel E is carried on a stud $e$, fixed to the back plate of the indicator. This planet-wheel meshes with the central pinion F and with a large outer internal gear G.

The counting-up operation is performed by inserting a coin of the prescribed size in a coin-slot K, so that the coin falls through coinciding slots in a tubular coin-driving barrel I and a coin-driven spindle H. The inserted coin is shown at $x$ in Fig. 5. Then by turning the outer wheel J a half-turn is imparted to the barrel I, and through the coin the spindle H is turned a half-revolution, the coin then dropping out through a conduit L and falling into a coin-box M. The gear G being stationary, the half-turn imparted to the spindle H and pinion F causes the planet-wheel E to roll within the gear G and carry forward its stud $e$, and thereby turn the indicator C one space, a ratchet $f$ preventing any backward turning. This operation is repeated for each coin inserted.

The counting-down movements are controlled by the magnet $Q^2$ through an escapement mechanism. The gear-wheel G has external gear-teeth $k$, which mesh with a pinion $l$ on the spindle of a gear-wheel O', which in turn meshes with a pinion $o'$ on the spindle of an escapement-wheel $O^2$, having a pin or escape-tooth $m'$, engaged by teeth or pallets on the upper ends of two escapement-levers or arms $P^3$ and $P^4$. Normally the escape-tooth is held by the stop-arm $P^4$. The release-arm $P^3$ is connected to the electromagnet so that by the excitation of the latter the arm $P^3$ is moved to the left and strikes the stop-arm $P^4$, pushing it to the left so that the escape-tooth becomes engaged by the release-arm. Upon the demagnetization of the magnet the release-arm moves to the right and frees the tooth $m'$, whereupon under the stress of the spring D (acting through the indicator C, planet-wheel E, gear G, and the escapement-train) the escape-wheel $O^2$ is caused to make a prescribed cycle of revolutions (fifteen with the proportions shown) sufficient to turn the indicator C backward one space, so as to count down one number. To prevent too rapid motion, the escape-wheel is preferably geared to a fly $O^3$. During the last turn of the escape-wheel a pin $e'$ on the wheel O' strikes a cam projection on the stop-arm $P^4$ and moves it enough to bring its end or pallet into the path of the tooth $m'$ to stop the escapement-train. The release-arm $P^3$ is frictionally connected to an operating-arm $P^2$, (preferably in the manner set forth in detail in my said application, Serial No. 262,194,) so that their relative angular positions may be readily adjusted. The stop-arm $P^4$ turns loosely on the same axis, being retained in either position by a light spring $p^5$ engaging it.

The prepayment mechanism thus described is identical with that set forth in my aforesaid patent, with the exception only of the operating-arm $P^2$, which instead of being operated by direct engagement with the totalizer of an electric meter is in my present construction operated by the electromagnet $Q^2$. For this purpose the armature $Q^3$ of this magnet is shown as pivoted and having an arm $Q^4$ projecting from it which engages the operating-arm $P^2$ of the escapement. Preferably the latter is forked or bifurcated and the arm $Q^4$ carries an antifriction-roller 51, entering the bifurcation.

The described prepayment mechanism is peculiarly advantageous for electromagnetic operation. The extreme movement of the indicator C does not exceed one complete revolution, an automatic stop preventing the insertion of another coin when the counting-up movements have carried it to the end of its revolution, so as to display the highest figure. (This stop is not here shown, being described in my said patent.) The spring D is of numerous convolutions and is wound to a suitable stress, so that the forward or backward movements of the indicator through one revolution make no appreciable difference in the effective stress of the spring. Hence the pressure communicated through the gearing or escapement-train to the stop-tooth $m'$ is practically alike in all positions of the indicator. Consequently the resistance to the movement of the release-arm $P^3$, which depends solely on the friction due to this pressure, is practically uniform at all times, so that whatever be the position of the indicator the electromagnet has a practically uniform work to do in releasing the escapement. This work is rendered very light, because owing to the long escapement-train the pressure of the spring is greatly diminished by the time this pressure is transmitted to the tooth $m'$ and thence to the release-arm, the mechanism being thus rendered very sensitive and imposing the least practicable load upon the magnet. In fact, the power required for operating the prepayment mechanism is all derived from the muscular effort exerted by the operator in turning the knob J during the counting-up movements, this power being stored in the spring and communicated therefrom to operate the escapement-train during the counting-down movements.

My invention avoids the disadvantages of prior prepayment mechanisms, wherein the counting-up movements turn the indicator to wind up a short spring the torque of which increases as each coin is counted up, and the counting-down movements are performed by an electromagnet directly operating a tripping device the resistance of which varies with each different position of the indicator and the minimum resistance of which, by reason of its direct engagement with the indicator, imposes upon the magnet a load many times greater than that encountered with my construction. My improved mechanism substitutes an extremely light and uniform load upon the magnet for the comparatively heavy and widely-varying load of prior devices. It also avoids any possibility of erroneous operation in the event that the consumer should be performing the counting-up operation at the instant when the operation of the meter causes the excitation of the electromagnet to perform the counting-down movement, which with the trip-action devices heretofore used is liable to release the indicator and cause it to fly back to zero, thereby cheating the customer to the extent of the value of the coins already inserted and counted up. With my construction the counting-up and counting-down mechanisms engage the indicator only through the planet-wheel E, so that they might operate simultaneously without any possibility of derangement.

I will now describe the circuit-closer, which is operated by the totalizer $A'$ of the meter A. In Figs. 6 and 7 this totalizer is shown as driven from the worm-spindle $b^2$ by means of a driving connection comprising an arm $b^3$ on this spindle and a crank $b^4$ on the initial or driving-spindle $b^5$ of the totalizer, a construction which permits the removal of the totalizer independently of the worm-wheel spindle; but any other connection between the spindles $b^2$ and $b^5$ may be used, or these may be constructed as one integral spindle. I have not shown the totalizer-train, which may be of any usual construction. On the unit (or kilowatt hour) spindle or arbor 51 is fixed a gear-wheel 52, which meshes with a pinion 53 on the circuit-closer spindle 54. This spindle is preferably carried by a separate frame 60, which carries also the other parts of the circuit-closer. The spindle 54 is best constructed as shown in detail in Fig. 11, its reduced ends forming journals which turn in bearing-arms 61 of frame 60. This spindle 54 has the pinion 53 and a two-toothed ratchet-wheel 55 fixedly applied upon it, as by pressing or driving them tightly thereon. Loosely pivoted upon this spindle is a hub or sleeve 56, carrying a weight or pendulum 57. The hub portion 58 of this weight has pivoted to it a spring-pressed pawl 59, engaging the teeth of the ratchet 55. It also carries a contact-pin 70, insulated from it by a bushing 71. Two parallel contact-springs 72 are mounted on but insulated from the frame 60, as shown in Fig. 9, with their free ends overlying the pin 70, so as to be rubbed thereby during its rotation. The springs 72 rest normally against a stop 73, of insulating material, and are lifted therefrom by the pin 70 in its passage, as indicated in Fig. 14. The rubbing surfaces of the springs and pin should be coated with silver or other non-corroding metal, as shown.

In operation the spindle 54 is driven from the unit-arbor through the gears 52 53 at such rate with reference to the price charged for the electric energy that the arbor makes a half-revolution each time that the escapement of the prepayment mechanism has to be released to cause the indicator C to count down one space. The spindle 54 carries with it the ratchet-wheel 55, a tooth of which pushes against the pawl 59, and thereby rotates the weight 57, lifting it from its lowermost to its uppermost position. In Fig. 12 it has lifted the weight to its highest point, so that upon advancing just beyond this point the weight will fall, sweeping through a half-circle, the pawl 59 sliding idly around the ratchet-wheel and dropping into engagement with the next tooth in advance, as shown in Fig. 13, where the weight has completed its downward movement and has been carried by its momentum slightly beyond the vertical, which insures the correct falling in of the pawl. This falling movement is practically instantaneous, so that the spindle 54, which turns very slowly, has not carried the ratchet-wheel perceptibly beyond the point at which the weight commenced to fall. During this falling movement the contact-pin 70 swings through an arc of one hundred and eighty degrees, beginning and ending its movement on a nearly horizontal line intersecting the axis of the spindle, so that in this movement the pin lifts and rubs under the springs 72, Fig. 14, thereby closing the circuit between these springs and sending a momentary current to the electromagnet. The contact-pin is displaced backwardly from a radius perpendicular to the radius which intersects the center of gravity sufficiently to insure that the weight shall pass over the dead-center and commence to fall before the contact-pin touches the springs, so that this pin cannot touch the springs too soon, in which case the friction might prevent the weight from falling. As the weight swings back to the vertical from the position in Fig. 13 the pawl is at once reengaged by the ratchet-wheel, so that during the next half-turn of the spindle the weight is again lifted. Thus the work imposed upon the totalizer-train is practically continuous except at the instant when the weight is falling, whereas if the spindle 54 were to make one complete turn to each counting-down movement the weight after falling would hang free while the spindle was executing an idle half-revolution, so that the spindle, turning at twice the speed, would do its entire work during each alternate half-revolution. My invention avoids this disadvantage and equalizes the work by spreading it practically over the entire revolution of the spindle. This construction also avoids the necessity of employing an extra counterweight to more uniformly distribute the work. Also, since the spindle 54 has to execute only a half-revolution to each counting-down movement, it moves at only half the speed required if there were one circuit-closure to each revolution, and hence the pinion 53 which drives it can be twice as large for a given frequency of circuit-closures, whereby the friction is proportionately reduced.

My construction enables the rate per kilowatt hour to be easily and quickly altered. To facilitate this, the frame 60 is made adjustable, so that the axis of the spindle 54 can be set to varying heights to suit varying sizes of the wheel 52 and pinion 53. To simply attain this object, the frame 60 is formed with a turned-up ear or flange 62, fastened to the totalizer-plate by two screws 63 and 64, the screw 63 passing through a round hole, so that it serves as a pivot around which the frame 60 may swing, while the screw 64 engages a slot 65, (which may be formed in the arc of a circle around the screw 63,) so that by loosening both screws the frame 60 may be swung up or down to bring the pinion 53 into proper mesh with the wheel 52, whereupon by tightening the screws the frame is held fixedly in this position. To change to a higher or lower rate of payment, it is necessary to change the ratio between the gears 52 53, which for a given range of prices can be done by changing only the pinion 53. For example, if the gear 52 (which makes one complete revolution to ten kilowatt hours) has one hundred and fifty teeth the pinion 53 will have fifteen teeth for the rate of twenty cents per kilowatt hour, or twenty teeth for a fifteen-cent rate, or twenty-five teeth for a twelve-cent rate, or thirty teeth for a ten-cent rate. For lower rates it is better to use a smaller gear-wheel 52. To change the rate, therefore, it is ordinary needful only to change the pinion 53, and for this purpose the officer who adjusts the instrument for an agreed rate is supplied with a suitable assortment of spindles 54, having various sizes of pinion 53. To change the rate, he loosens the screws 63 64 and drops the frame 60, or he may entirely disconnect this frame. He then takes the spindle 54 from its bearings, to facilitate which one pivotal end of this spindle turns in a screw 66, screwing into one of the arms 61, so that by removing this screw the spindle may be dropped out of the frame. He then slips off the sleeve 56 carrying the weight and exchanges the spindle for one having a pinion of the required size, or he may force off the pinion 53 and replace it with a pinion of the required size without changing the spindle. He then replaces the sleeve on the spindle, puts the spindle into its bearings in the frame, and moves up the frame until the pinion comes properly into mesh with the gear-wheel, whereupon he tightens the fastening-screws 63 64. The fragmentary view, Fig. 15, shows the frame 60 dropped and the spindle and weight removed.

For some electric meters it is impracticable to mount the frame 60 on the lower side of the totalizer, it being necessary to place it on the upper side thereof. In such case the separate frame 60 may be applied to the upper side of the totalizer, so as to bring the pinion 53 above the wheel 52 instead of below it.

In some cases, and particularly in a meter for alternating currents, it is necessary that the contact be held closed for a longer period of time than would be afforded during the mere falling of the weight. With an alternating current which is liable to vary in frequency an increase of frequency increases the self-induction of the magnet, so that it takes longer to acquire sufficient intensity to do a given work, or if the voltage is less than that for which the magnet was adjusted it requires a longer excitation to give the same pull. Other practical conditions also make it desirable that provision be made for a prolonged circuit-closure. For this purpose I apply a retarding device to moderate the descent of the weight, and thereby cause it to fall more slowly and prolong the circuit-closure. This construction of circuit-closer is shown in Figs. 16 to 20. The weight 57 is essentially unchanged, although varied slightly in shape. Attached to the weight is a toothed wheel 74, which drives a pinion 75 on a spindle 76, carrying a fly or fan 77. The frame 60 has its arms 61 modified in shape to afford bearings for the spindle 76 and by a downward extension 67 to engage a stiffening-rod 68. A screw-bushing 78 is provided to form one of the bearings for the spindle 76 to facilitate its removal. The weight 57 is mounted, as before, on a sleeve 56; but this is prolonged, (see Fig. 18,) and carries also a disk 79, to which the pawl 59 is pivoted. The operation is precisely the same as with the construction already described, except that the fall of the weight is retarded by the necessity of driving the fan 77, thereby giving a prolonged contact. This retardation of the fall checks the momentum, so that the weight does not swing so far as before past the vertical, and hence introduces the liability that it might not swing far enough to cause the pawl to properly engage with the next tooth of the ratchet. This liability would be greatest when the frame 60 is tilted downward far enough to accommodate the largest pinion 53 required for the lowest rate of payment. To overcome this difficulty, I provide a spring which gives an added impulse to the weight in falling sufficient to carry its pawl past the next tooth of the ratchet with any possible adjustment. This spring is a leaf-spring 80, preferably fastened to the frame 60. This spring has a flat end portion 81, which as the weight 57 rises to about the horizontal is engaged by a roller 82, (see Fig. 19,) carried by the weight-arm, and as the weight rises beyond this point toward the vertical it lifts the spring 80 until on passing the vertical, Fig. 20, the roller 82 rolls off the flat portion 81, so that as the weight begins to fall a curved or inclined part 83 of the spring acts against the roller to give an impetus or forward push to the weight which accelerates its descent and assists it in starting the whirling motion of the fan. The spring is of just sufficient stiffness to impart the necessary additional velocity to the weight to insure that in its fall it shall carry far enough to make the reëngagement of the pawl a certainty. The spring has another advantage in that it equalizes the work performed by the totalizer. In lifting the weight the work gradually increases as the weight approaches the horizontal, Fig. 19, and from this point to the top the work gradually diminishes. This diminution, however, is compensated for by the displacement of the spring 80, the stress of which gradually increases as the roller 82 lifts it, its increase being proportioned to approximately compensate for the diminution of the effective weight during this portion of the movement.

Referring to Fig. 1, the springs 72 are connected, respectively, to the wires of a shunt $x'$, which extends from one of the binding-posts of the meter and includes the springs 72 and the coil of the relay-magnet $Q^2$ and terminates at one of the binding-posts of the prepayment device. Any other suitable arrangement of a shunt-circuit or of an independent circuit may be used. It is preferable, however, to employ a shunt which takes current from the main circuit for operating the magnet. In the case of an alternating-current circuit, therefore, the magnet $Q^2$ must be adapted to be excited by the alternating current under the varying conditions of practice. It is desirable to construct the magnet so that it is operable indifferently by a direct or alternating current of any character practically used in order that the prepayment device may be applied without change to any ordinary lighting or similar circuit. To adapt the magnet for use with alternating currents, it is made with a laminated core and armature in any ordinary manner. The magnet is shown with a laminated core 85 of U form, Fig. 21, with an exciting-coil 86 applied on one of its arms or poles and the armature pivoted adjacent to the other pole. The coil is wound with numerous turns of fine wire in order to insure the requisite energizing of the magnet on the lowest voltage likely to be met with in direct-current service. If this same magnet were connected in an alternating - current service, the self-induction would be so great, because of the great number of turns of fine wire, that the alternating current would not sufficiently energize the magnet. To overcome this difficulty, I apply a band of copper 87, Fig. 22, upon one of the legs of the core and within the coil 86, so that it forms a closed circuit of sufficient conductivity to reduce the self-induction of the coil of many turns to such point that the magnet becomes effective notwithstanding this self-induction. This construction of magnet renders the instrument of universal application.

The circuit arrangement shown in Fig. 1 is a suitable one, the line-wires being carried first to the meter and thence, with the shunt-wire $x'$, to the prepayment device, from which lead the wires which feed the lamps, as indicated. The prepayment device includes, as usual, a switch T for shutting off the current when the customer's prepayment is exhausted. This switch may be variously operated— as, for example, by the means set forth in my said patent.

The coin-box M is shown as provided, as before, with a pin-tumbler lock engaging a pendent rod or post M', secured to the casing, and in addition with a seal in order to detect any effort to tamper with the lock and as an additional precaution against the abstraction of the accumulating coins. For this a hole 39 is drilled through the barrel 30 of the lock and also through its socket or casing 29, as shown in Fig. 5, through which hole is passed a wire 40, the ends of which are joined by a seal. As this wire intersects the key-slot, any effort to force in a key or otherwise to tamper with the lock is certain to be either blocked by the wire or to result in severing the wire, in which latter case the attempt is exposed, or if the lock should be picked and the barrel turned this would shear off the wire and likewise expose the fraud My invention is susceptible of a considerable degree of modification without departing from the essential features thereof which are set forth in the claims. Although I have described in some detail the construction of prepayment device set forth in my aforesaid patent and application, yet it is not to be understood that my present invention is limited to the use of such construction otherwise than is recited in my present claims.

I claim as my invention—

1. In a prepayment-meter, an indicator having a limited range of movement, a relatively long spring therefor, adapted to exert a substantially uniform stress through such range of movement, a counting-up device for turning said indicator against the stress of said spring, a releasing device for permitting the return or counting-down movements of said indicator, and an electromagnet operating said releasing device, whereby the work performed at each excitation of the magnet is substantially unvarying.

2. In a prepayment-meter, an indicator having a limited range of movement, a spring of many turns therefor, adapted to exert a substantially uniform stress through such range of movement, a counting-up device for turning said indicator against the stress of said spring, an escapement-train, an escapement for permitting the return or counting-down movements of said indicator, and an electromagnet operating said escapement whereby the substantially uniform torque of the spring is diminished through said train, and renders the work imposed upon the magnet very light and substantially uniform.

3. In a prepayment-meter, an indicator having a limited range of movement, a spring of many turns therefor, adapted to exert a substantially uniform stress through such range of movement, a planet-wheel, a counting-up device acting through said planet-wheel to turn said indicator against the stress of said spring, an escapement-train actuated fro said spring through said planet-wheel, an escapement for permitting the return counting-down movements of said indicator, and an electromagnet operating said escapement.

4. In a prepayment-meter an indicator, a spring therefor, a counting-up device, and a magnetically-operated escapement, the latter comprising an escape-tooth, a release-arm therefor, and an electromagnet the armature of which is connected to and operates said release-arm.

5. In a prepayment-meter, an indicator, a spring therefor, a counting-up device, a magnetically-operated escapement, the latter comprising an escape-tooth, a stop-arm, and a release-arm engaging said tooth, and an electromagnet with its armature connected to operate said arms.

6. In a prepayment-meter, an indicator, a spring therefor, a counting-up device, a magnetically-operated escapement, the latter comprising an escape-tooth, a stop-arm, a release-arm engaging said tooth, an electromagnet with its armature connected to said release-arm, and a cam for operating said stop-arm in one direction, said arm being engaged by the release-arm to be operated in the opposite direction.

7. In a prepayment electric meter, an indicator, a spring therefor, a counting-up device, and a counting-down mechanism comprising an escapement, an electromagnet operating it, its armature, the release-arm of said escapement, an actuating-arm connected thereto, and a separable joint forming a direct pivotal connection between said arm and the armature.

8. In a prepayment electric meter, a magnetically-operated counting-down mechanism, combined with an actuating electroism, combined with an actuating electromagnet having a laminated core, an exciting-coil, and a closed circuit of low resistance adapted to diminish the self-induction of the coil and render the magnet effective on either an alternating or a direct current.

9. In a prepayment electric meter, a circuit-closer operated by the totalizer, comprising a spindle geared to the totalizer in such ratio as to make a half-turn for each circuit-closure, circuit-closing contacts, and a weight loosely hung on said spindle, with means for elevating it during each successive half-turn of the spindle and thereupon releasing it and permitting it to fall and close the circuit.

10. In a prepayment electric meter, a circuit-closer operated by the totalizer comprising a spindle geared to the totalizer in such ratio as to make a half-turn for each circuit-closure, circuit-closing contacts, a weight loosely hung on said spindle, and a two-toothed ratchet and pawl connecting said weight to said spindle, whereby the weight is elevated and released to each half-turn of the spindle.

11. In a prepayment electric meter, a circuit-closer driven by the totalizer comprising a spindle and circuit-closing contacts, and a frame carrying them adjustable relatively to the totalizer.

12. In a prepayment electric meter, a circuit-closer driven by the totalizer, comprising a spindle and circuit-closing contacts, and an adjustable frame carrying them pivoted to the totalizer-frame and adapted to swing around its pivot.

13. In a prepayment electric meter, a circuit-closer driven by the totalizer, comprising a spindle and circuit-closing contacts, and an adjustable frame carrying them, having a removable bushing forming one pivotal bearing for said spindle.

14. In a prepayment electric meter, a circuit-closer operated by the totalizer, comprising a spindle, a weight hung loosely thereon, circuit-closing contacts operated by said weight, and an adjustable frame carrying said spindle and contacts.

15. In a prepayment electric meter, a circuit-closer operated by the totalizer, comprising a spindle, a weight hung loosely thereon, a connection between said spindle and weight whereby the weight is alternately elevated and released, circuit-closing contacts operated by the fall of the weight, and a retarder connected to said weight for retarding its fall and prolonging the contact.

16. In a prepayment electric meter, a circuit-closer operated by the totalizer, comprising a spindle, a weight hung loosely thereon, a connection between said spindle and weight whereby the weight is alternately elevated and released, circuit-closing contacts operated by the fall of the weight, a retarder for the weight to prolong the circuit-closure, and an accelerator for hastening the fall of the weight.

17. In a prepayment electric meter, a circuit-closer operated by the totalizer, comprising a spindle, a weight hung loosely thereon, a connection between said spindle and weight whereby the weight is alternately elevated and released, circuit-closing contacts operated by the fall of the weight, a retarder for the weight to prolong the circuit-closure, and an accelerator for hastening the fall of the weight, comprising a spring flexed by the weight in its ascent and reacting against the weight in its descent.

18. In a prepayment electric meter, a circuit-closer operated by the totalizer, comprising a spindle, a weight hung loosely thereon, a connection between said spindle and weight whereby the weight is alternately elevated and released, circuit-closing contacts operated by the fall of the weight, a retarder for the weight to prolong the circuit-closure, and an accelerator for hastening the fall of the weight, comprising a spring having a flat surface engaged by the projection on the weight, and an inclined portion reacting against said projection as the weight begins to fall.

19. In a prepayment electric meter, a circuit-closer operated by the totalizer, comprising a spindle, a weight hung loosely thereon, a connection between said spindle and weight whereby the weight is alternately elevated and released, circuit-closing contacts operated by the fall of the weight and a spring engaged by the weight when approximately half lifted, arranged to equalize the load by the increasing resistance of the spring as the effective gravitation of the weight diminishes.

In witness whereof I have hereunto signed my name in the presence of two subscribing witnesses.

JAMES J. WOOD.

Witnesses:
  FRANK MCMASTER,
  A. L. HADLEY.